United States Patent [19]

Haenen et al.

[11] Patent Number: 4,577,217
[45] Date of Patent: Mar. 18, 1986

[54] ENCODING CIRCUIT FOR A SECAM COLOR TELEVISION TRANSMISSION

[75] Inventors: Henricus W. G. Haenen; Antonie van Leeuwen, both of Eindhoven, Netherlands

[73] Assignee: U.S. Philips Corporation, New York, N.Y.

[21] Appl. No.: 469,543

[22] Filed: Feb. 25, 1983

[30] Foreign Application Priority Data

Mar. 23, 1982 [NL] Netherlands .................. 8201188

[51] Int. Cl.⁴ .............................................. H04N 9/40
[52] U.S. Cl. ..................................................... 358/14
[58] Field of Search ................................... 358/14, 23

[56] References Cited

U.S. PATENT DOCUMENTS 4,145,711 3/1979 Aschwanden ..................... 358/14
4,327,372 4/1982 Van der Valk ...................... 358/14

Primary Examiner—Richard Murray
Attorney, Agent, or Firm—Thomas A. Briody; William J. Streeter; Leroy Eason

[57] ABSTRACT

An encoding circuit for a SECAM color television transmission, comprising a frequency-modulatable oscillator for a modulating signal which comprises two line-sequential color difference signals, the circuit also comprising a control loop for making the quiescent frequencies in the generated frequency-modulated signal substantially equal to reference frequencies. For this purpose the control loop comprises a multiplexer, a frequency demodulator and two control paths each having two sample- and -hold circuits. The sequence of the signals conveyed by the multiplexer and the time position of the measuring intervals are chosen such that at least a line scan period is located between the quiescent frequency-measuring interval and the reference frequency-measuring interval.

7 Claims, 3 Drawing Figures

ENCODING CIRCUIT FOR A SECAM COLOR TELEVISION TRANSMISSION

BACKGROUND OF THE INVENTION

1. Field of the Invention

The invention relates to an encoding circuit for a SECAM colour television transmitter, comprising a frequency-modulatable oscillator for converting a modulating signal which contains two line-sequential colour difference signals into a frequency-modulated signal which has a first quiescent frequency when the first colour difference signal is zero and a second quiescent frequency when the second colour difference signal is zero, also comprising a control loop for making the first quiescent frequency substantially equal to the frequency of a first reference signal generator and the second quiescent frequency substantially equal to the frequency of a second reference signal generator, this control loop comprising a multiplexer operated by a pulse generator for applying in a predetermined sequence the frequency-modulated signal and the first and second reference signals to a frequency demodulator to which is connected a first control path for generating a first control information for the oscillator and a second control path for generating a second control information for the oscillator, the first and second control paths each being operative during predetermined measuring intervals in which the signal conveyed by the multiplexer has the reference or the carrier frequencies, respectively, for comparing the said frequencies.

2. Description of the Related Art

Such an encoding circuit is disclosed in British Patent Specification No. 1,509,958. The operation of the control loop in this prior art circuit ensures that the frequency of the frequency-modulated signal is equal to the frequency of the relevant reference signal generator during a time interval in which the modulating colour difference signal is zero. This is effected line-sequentially, that is to say for one line the quiescent frequency of the frequency of the red reference signal $f_{OR} = 4.40625$ MHz and for the subsequent line it assumes the frequency of the blue reference signal $f_{OB} = 4.250$ MHz. As the frequency-modulated signal must be at its quiescent frequency during the line blanking period, this signal is demodulated for a short period within this blanking period and the information thereby obtained is compared with the information obtained by demodulation of the reference signal during the subsequent line scanning period. The error signal thus obtained, corresponding to the difference between the quiescent and reference frequency contains the required control information. For this purpose the control loop comprises two separate control paths, one for red and one for blue.

In the prior art circuit the frequency demodulator receives its input signal from a multiplexer in a predetermined sequence. During a line blanking period the frequency-modulated signal with the frequency $f_R$ generated by the oscillator is conveyed to the demodulator and during the subsequent line scan period the signal with the reference frequency $f_{OR}$ is conveyed to the demodulator. During the next blanking period the frequency-modulated signal $f_B$ and during the subsequent line scanning period the reference frequency signal $f_{OB}$ are conveyed to the demodulator's whereafter the sequence is repeated. So within a sequence of two lines, the signals to be compared succeed each other after the short period of time between a blanking period and the next line scan.

This sequence has the following drawback. A square-wave switching signal of half the line frequency is operative in the encoding circuit in several places, more specifically for changing-over the information from a blue line to the information of a red line and vice versa. This change-over is usually effected during the line blanking period, i.e. at an instant at which no colour signals are generated. For the prior art encoding circuit this means that the change-over occurs during a very short period of time, namely some micro-seconds, prior to measuring the frequencies $f_R$ and $f_B$. However, at the change-over a very rapid change of the frequency occurs, which change produces a large and sudden phase change for the frequency demodulator. At the measuring instant this sudden change may influence the level to be measured, which introduces an error in the control information applied to the oscillator.

SUMMARY OF THE INVENTION

It will be obvious that the described disturbance of the frequency measurement can be prevented from occurring if the switching signal of half the line frequency is such that its leading edge occurs a sufficiently long period of time prior to the instant at which the frequency is measured. As the switching signal is also active in other places in the encoding circuit, and the position of the leading edge must there be located differently, this implies that the switching signal required for the control of the quiescent frequencies must be subjected to a predetermined delay relative to similar signal used elsewhere in the circuit. This requires a number of delay elements.

The invention has for its object to provide an encoding circuit of the above-described type wherein a large portion of the circuit may be in the form of an integrated circuit. For such a construction the said delay would be disadvantageous in view of the required delay elements with associated terminals because of the fact that the number of terminals of an integrated circuit is limited. With the invention, the encoding circuit does not require such a delay and is characterized in that the switching signals generated by the pulse generator for determining the sequence of the signals conveyed by the multiplexer and the time position of the measuring intervals occur during determined periods, in such a way that at least one line scan period is located between the quiescent frequency-measuring interval and the reference signal frequency-measuring interval.

As the measuring intervals are thereby sufficiently spaced in the time, the transition from a red to a blue line or from a blue to a red line, occurring between the measuring intervals, has no appreciable influence on the generated control informations.

One embodiment of the encoding circuit is characterized in that each control path comprises a first and a second sample-and-hold circuit, the first sample and-hold circuit being operative during at least a portion of a line scan period and the second sample-and-hold circuit being operative during the line blanking period occurring at the end of the subsequent line scan period.

Preferably, the encoding circuit is characterized in that at least a portion of a line scan period is located between the period of time in which the second sample-and-hold circuit of the first control path is operative and the period of time in which the first sample-and-hold circuit of the second control path is operative, characterized in that the multiplexer conveys the frequency modulated subcarrier and reference frequency input signals applied to it to the frequency demodulator in the following sequence; two line periods with the first reference signal, one line period with the frequency-modulated subcarrier signal which assumes the first quiescent frequency when the modulating signal is zero, two line periods with the second reference signal, one line period with the frequency-modulated subcarrier signal which assumes the second quiescent carrier frequency when the modulating signal is zero, etc.

BRIEF DESCRIPTION OF THE DRAWINGS

The invention will now be further described by way of example with reference to the accompanying Figures, wherein.

DESCRIPTION OF THE PREFERRED EMBODIMENTS

Figure 1:
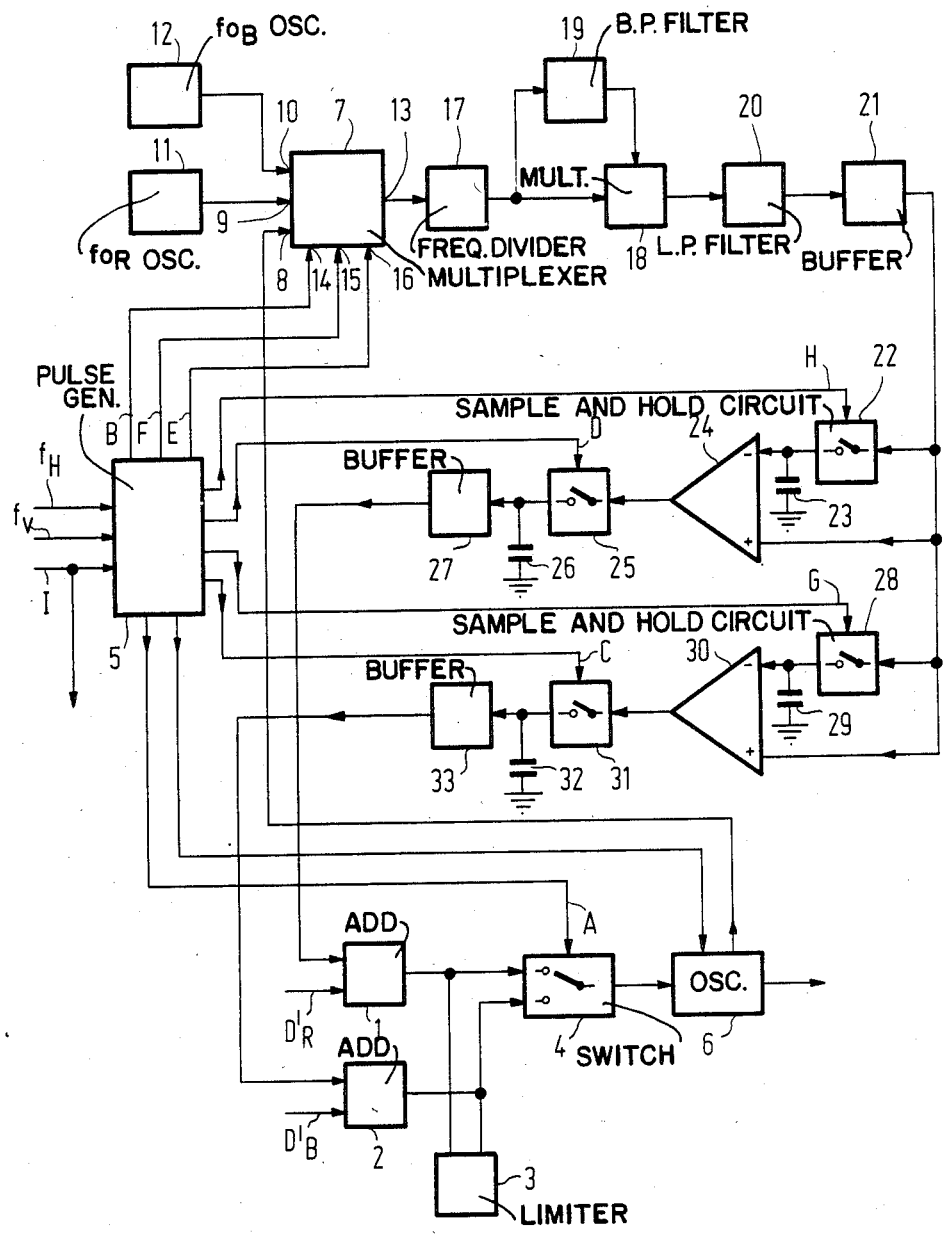
FIG. 1 shows a block-schematic circuit diagram of a portion of an encoding circuit in accordance with the invention.

In FIG. 1 reference numeral 1 denotes an adder stage, to which a colour difference signal for red $D_R'$ is applied, while the colour difference signal for blue $D_B'$ is applied to an adder stage 2. Direct voltages which are generated in a manner still further to be described are also applied to the adder stages 1 and 2. The signals from stages 1 and 2 are limited by means of a limiter 3 and the signals obtained are applied to a change-over switch 4 which is operated by a switching signal A of half the line frequency. Signal A, which is plotted in FIG. 2a as a function of the time is generated by a pulse generator 5, which also holds for the other switching signals active in the circuit of FIG. 1. A signal of the line frequency $f_H$ as well as a signal having the field frequency $f_V$ are applied to generator 5. Change-over switch 4 applies a line-sequential signal to the modulating signal input terminal of an oscillator 6, which signal is the (limited) red signal $D_R'$ when signal A is high and the (limited) blue signal $D_B'$ when signal A is low.

From generator 5 a switching signal is also applied to oscillator 6 for determining for each line in known manner the initial phase of the frequency modulated signal generated by oscillator 6. In addition, the phase is inverted every third line and every second field. Oscillator 6 generates a frequency-modulated signal the phase of which is further processed in known manner. Prior to such further phase processing operations the signal is also applied to an input terminal 8 of a multiplexer 7.

A signal having the reference frequency for red $f_{OR} = 4.40625$ MHz is applied to a second input terminal 9 of multiplexer 7 and a signal having the reference frequency for blue $f_{OB} = 4.250$ MHz is applied to a third input terminal 10 of multiplexer 7. These signals are generated by a reference oscillator 11 and a reference oscillator 12, respectively, the oscillators being locked in known manner on the line frequency $f_H$. The mode of operation of multiplexer 7 ensures that the signals from oscillators 6, 11 and 12 occur in a predetermined sequence at the output terminal 13 of multiplexer 7. For this purpose switching signals B, F and E, which are generated by pulse generator 5 are applied to three input terminals 14, 15 and 16, respectively of multiplexer 7. A frequency dividing circuit 17 is connected to terminal 13. The output signal of circuit 17 is applied to a multiplying stage 18 and to a bandpass filter 19. The signal at the output of filter 19 is applied to stage 18. Stage 18 and filter 19 form together a synchronous frequency demodulator whose output signal is frequency-limited by means of a low-pass filter 20. Circuit 17 divides the frequency by two. This results in that signals having the same frequency and which have or do not have the same shape are converted into signals of half the frequency and of equal shape. After demodulation, a direct voltage is obtained the value of which exclusively depends on the frequency deviation on account of the frequency-dependent phase shift occurring in filter 19. Via a buffer stage 21 the frequency-demodulated direct voltage is applied to a switch 22, to a switch 28, to the non-inverting input terminal of a differential amplifier 24 and also to the non-inverting input terminal of a differential amplifier 30.

The other side of switch 22 is connected to a capacitor 23 and to the inverting input terminal of the amplifier 24 the output terminal of which is connected to a switch 25. The other side of switch 25 is connected to a capacitor 26. The other terminal of capacitors 23 and 26 are connected to ground. The voltage across capacitor 26 is applied to adder stage 1 via a buffer stage 27. Switch 22 is operated by a switching signal H, while switch 26 is operated by a switching signal D, these two switching signals being generated by generator 5.

In a similar manner switch 28 is operated by a switching signal G. Switch 28 is connected to a capacitor 29 and to the inverting input terminal of amplifier 30, the output terminal of which is connected to a switch 31. Switch 31 is operated by a switching signal C and its other side is connected to a capacitor 32. The other terminals of capacitors 29 and 32 are connected to ground. The voltage across capacitor 32 is applied to adder stage 2 via a buffer stage 33. The two switching signals G and C are generated by pulse generator 5.

Figure 2:
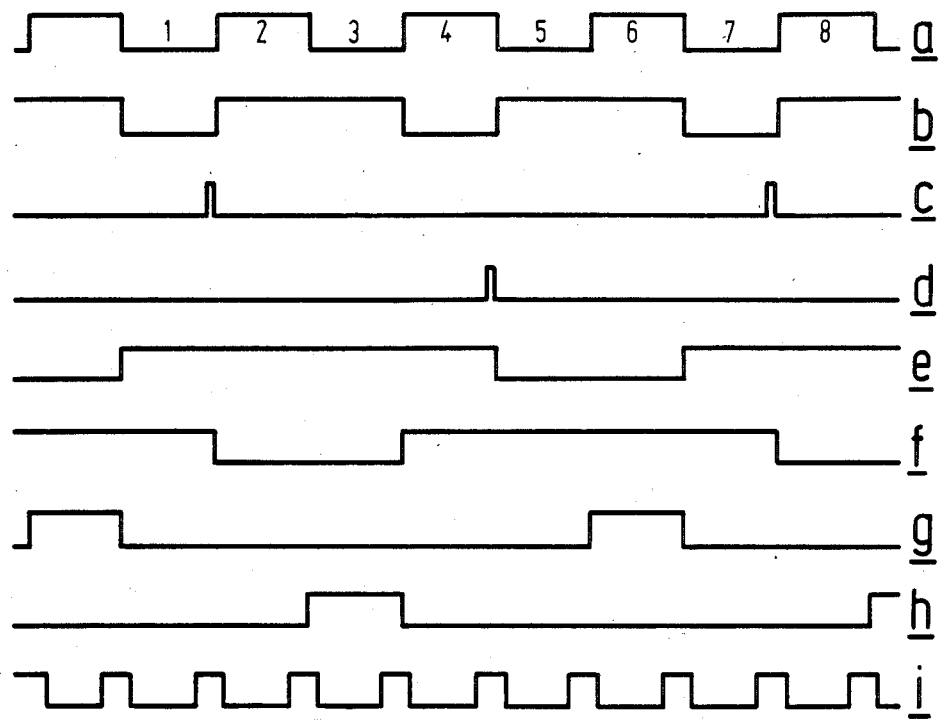
FIG. 2 shows waveforms occurring therein and FIG. 3 shows a more detailed circuit diagram of the multiplexer of FIG. 1.

The switching signals B, F and E applied to multiplexer 7 are plotted in FIG. 2 at b, f and e, respectively. Signal B has a repetition rate which is one third of the line frequency. During one line in three signal B is low and during the subsequent two lines it is high. The repetition rate of signals F and E is equal to one-sixth of the line frequency, these signals being low during two adjacent lines and high during the subsequent four lines. From FIG. 2 it can be seen that the sequence of signals B, F and E has been chosen such that during a certain blue line (signal A low), which is designated by the reference numeral 1, signal B is low while signals F and E are high. During lines 2 and 3 signals B and E are high, while signal F is low. Line 4 is a red line (signal A high): now signal B is low whereas signals F and E are high. Finally, during lines 5 and 6 signals B and F are high, while signal E is low, whereafter the situation prevailing during line 1 is repeated during line 7.

Multiplexer 7 is of such a construction that a particular one of the input signals thereto is conveyed to its output terminal 13 when a particular one of the applied switching signals B, F and E is low. For the input signal at terminal 8, i.e. the frequency-modulated signal generated by oscillator 6, it is conveyed when switching signal B is low. During the above-described sequence of 6 lines this is during lines 1 and 4; during line 1 the input signal at terminal 8 being modulated by signal $D_B'$ and during line 4 the input signal at terminal 8 being modulated by signal $D_R'$. Similarly, the reference signal $f_{OR}$ at input terminal 9 is conveyed when switching signal F is low, which is the case during lines 2 and 3, whereas the reference signal $f_{OB}$ at input terminal 10 is conveyed when switching signal E is low, which is the case during lines 5 and 6. So the following signals occur sequentially at terminal 13: two lines with the red reference signal $f_{OR}$, one line with the red FM-signal, two lines with the blue reference signal $f_{OB}$, one line with the blue FM-signal, etc.

FIG. 2c shows the variation of switching signal C. In a similar manner FIGS. 2d, 2g and 2h show the variation of switching signals D, G and H, respectively. Signal H occurs during line 3 or at least during a large portion thereof, in which period of time switch 22 is conductive. The voltage then conveyed is the result of the demodulation of signal $f_{OR}$, which is a direct voltage if switch 22 is conductive for a sufficiently long period of time and is present across capacitor 23 and remains substantially constant when switch 22 is opened again, more specifically until signal H occurs again, which is during line 9. Switch 22 and capacitor 23 consequently form a sample-and-hold circuit. By means of differential amplifier 24 the voltage stored across capacitor 23 corresponding to signal $f_{OR}$ is compared with the signal from stage 21 which is the result of the demodulation of the sequential red FM signal present at terminal 13 during line 4. Switch 25 and capacitor 26 form a sample-and-hold circuit which is operative during the occurrence of pulse D. Pulse D is produced during a portion of the line blanking period between lines 4 and 5 which is located in line 4. To this end the trailing edge of pulse D occurs a short period of time before the transition edge of signal A between lines 4 and 5. By way of comparison, FIG. 2i shows the line blanking signal I which is inter alia used to suppress the colour information applied to stages 1 and 2 and which is applied to generator 5. In these circumstances the voltage present across capacitor 26 is a measure of the difference between the frequency of the signal generated by oscillator 6 during blanking at the end of a red line, the what is commonly referred to as the quiescent frequency for red, and the target value thereof, that is to say frequency $f_{OR}$.

Signal G closes switch 28 during line 6 or at least a large portion thereof and the voltage obtained by means of sample-and-hold circuit 28, 29 is the result of demodulation of the signal $f_{OB}$ which is present at terminal 13 during lines 5 and 6 and the two lines preceding line 1, respectively. Pulse C closes switch 31 during a portion of the line blanking period located between lines 1 and 2, and 7 and 8, respectively, which blanking periods are located in line 1 and 7, respectively. The trailing edge of pulse C occurs a short time prior to the transition edge of signal A between lines 1 and 2, and 7 and 8, respectively. The voltage present across capacitor 32 is a measure of the difference between the frequency of the signal generated by oscillator 6 during blanking at the end of a blue line, the what is commonly referred to as the quiescent frequency for blue, and the target value thereof, that is to say frequency $f_{OB}$. The voltages across capacitors 26 and 32 partly determine the direct voltage component of the colour difference signals applied to oscillator 6. From the foregoing it can be seen that the circuit of FIG. 1 comprises a control loop with two control paths, namely the path including elements 22 to 27, inclusive and the path including elements 28-33 inclusive respectively. The action of such control loop, which also comprises elements 7 and 17 to 21, inclusive, readjusts oscillator 6 in such a way that the two quiescent frequencies thereof have substantially the target values $f_{OB}$ and $f_{OR}$. This means that the frequency of the generated, frequency-modulated signal is equal to $f_{OR}$ during the red line in periods of time, specifically the line blanking period, in which the red colour difference signal is zero and to $f_{OB}$ during the blue line in periods of time, specifically the line blanking periods, in which the blue colour difference signal is zero.

From the foregoing it can be seen that in the circuit of FIG. 1 the red reference frequency is measured during line 3 and the red quiescent frequency at the end of line 4, whereas the blue reference frequency is measured during line 6 and the blue quiescent frequency at the end of line 7. Because of the comparatively long interval between measurement of the corresponding reference and quiescent frequencies, i.e. at least the line scan period during which picture information occurs, the change-over between a blue and a red line, and between a red and a blue line, respectively, which change-over action occurs simultaneously with an edge of signal A and produces a large sudden phase change in the demodulator 18, 19, has no appreciable influence on the results of these measurements. The demodulated reference frequency voltage is each time stored during a large portion of a line period, and the storage time is sufficiently long to ensure that such a detrimental influence does not manifest itself.

A sequence of 6 lines is employed in the circuit shown in FIG. 1. The frequency of the required switching signals and of the sampling pulses is then one-third and one-sixth of the line frequency, respectively. A sequence of 4 lines, the said frequency then being equal to half and one-quarter of the line frequency, respectively is however also conceivable. The following sequence would then occur, for example; a line with $f_{OB}$, a line with $f_{OB}$, a line with the red FM-signal, a line with the blue FM-signal, etc. The measurement for red would be effected during the second and third lines, whereas the measurements for blue would be effected during the first and fourth lines. The storage periods are therefore different, which could cause errors. This drawback may be obviated by the following choice: a line with $f_{OR}$, a line with $f_{OB}$, a line with the red FM-signal, a line with the blue FM-signal, etc. The storage periods for both channels are then equal, as the measurements for red are effected during the first and third lines and the measurements for blue during the second and fourth lines. These storage periods are, however, almost two lines long. Such a sequence is indeed suitable for use, but since the storage of the information in capacitors 23 and 29 must be of the shortest possible duration in order to obtain the smallest possible error the 6-line sequence should be preferred.

Figure 3:
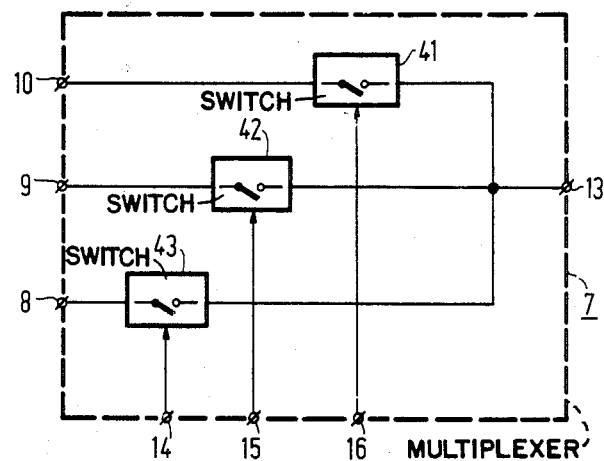

FIG. 3 shows a circuit diagram of a possible construction of multiplexer 7. A switch 41 is arranged between input terminal 10 and output terminal 13. In like manner, a switch 42 is arranged between input terminal 9 and terminal 13 and a switch 43 between input terminal 8 and terminal 13. Switch 41 is operated by the signal at terminal 16. In like manner, switch 42 is operated by the signal at terminal 15 and switch 43 by the signal at terminal 14. As can be seen from FIGS. 2b, 2e and 2f, the switching signals B, F, E at terminals 14, 15 and 16 must not simultaneously be low in order to close only the relevant switch. Consequently, the input signals at terminals 8, 9 and 10 are conveyed to output terminal 13 in a sequence determined by the switching signals.

What is claimed is:

1. An encoding circuit for a SECAM color television transmitter in which two line-sequential color difference signals modulate a color subcarrier signal generated by a frequency-modulatable oscillator, the generated subcarrier signal being at a first quiescent frequency during scanning line periods of the first color difference signal and at a second quiescent frequency during scanning line periods of the second color difference signal, the modulated subcarrier signal being at the quiescent frequency corresponding to any scanning line period during a blanking interval thereof in which the relevant color-difference signal is zero, such encoding circuit comprising:

means for generating a first reference signal at a frequency which is a reference for said first quiescent frequency and a second reference signal at a frequency which is a reference for said second quiescent frequency;

a frequency demodulator adapted to derive at its output a demodulated voltage of a value dependent on the frequency of a signal applied to its input;

a multiplex circuit connecting said reference signal generating means and said frequency-modulatable oscillator to the input of said frequency demodulator;

pulse generating means adapted to supply switching signals to said multiplex circuit which cause it to apply to the input of said frequency demodulator predetermined sequences of said modulated subcarrier signal and said first and second reference frequency signals during successive scanning line periods;

a first control path connected to the output of said frequency demodulator and responsive to further switching signals supplied by said pulse generating means to a produce a first control voltage by subtracting the demodulated voltage derived from said first reference frequency signal during predetermined scanning line periods from the demodulated voltage derived from said modulated subcarrier signal during the blanking intervals of predetermined scanning line periods when such signal is at said first quiescent frequency;

a second control path connected to the output of said frequency demodulator and responsive to further switching signals supplied by said pulse generating means to produce a second control voltage by subtracting the demodulated voltage derived from said second reference frequency signal during predetermined scanning line periods from the demodulated voltage derived from said modulated subcarrier signal during the blanking intervals of predetermined scanning line periods when such signal is at said second quiescent frequency;

and means connected to each of said control paths for applying said first and second control voltages to said frequency-modulatable oscillator to modify the first and second quiescent frequencies thereof to correspond with said first and second reference frequencies;

the switching signals supplied by said pulse generating means being sequenced so that there is at least one scanning line period between those during which are derived the demodulated voltages which are subtracted to produce each of said control voltages.

2. An encoding circuit as claimed in claim 1, characterized in that each control path comprises a first and a second sample-and-hold circuit, the first sample-and-hold circuit of each control path being operative during at least a portion of each of alternate scanning line periods to store the demodulated voltage derived from one of said reference frequency signals and the second sample-and-hold circuit of each control path being operative during the line blanking interval of the succeeding scanning line period to derive the control voltage produced by such control path.

3. An encoding circuit as claimed in claim 2, characterized in that there is at least a portion of a scanning line period between the scanning line period in which the second sample-and-hold circuit of the first control path is operative and the scanning line period in which the first sample-and-hold circuit of the second control path is operative.

4. An encoding circuit as claimed in claim 2, characterized in that between the first and the second sample-and-hold circuit of each of said control paths a comparator is provided for comparing the demodulated voltage produced by said frequency demodulator and the demodulated voltage stored by the first sample-and-hold circuit.

5. An encoding circuit as claimed in claim 1, characterized in that the multiplexer applies the modulated subcarrier signal and the first and second reference frequency signals to the input of said frequency demodulator in the following repeated sequence: a line period with the first reference signal, a line period with the second reference signal, a line period with the frequency-modulated subcarrier signal which has said first quiescent frequency, and a line period with the frequency-modulated subcarrier signal which has said second quiescent frequency.

6. An encoding circuit as claimed in claim 1, characterized in that the multiplexer applies the modulated subcarrier signal and the first and second reference frequency signals to the input of said frequency demodulator in the following repeated sequence: two line periods with the first reference signal, one line period with the frequency-modulated subcarrier signal which has said first quiescent frequency, two line periods with the second reference signal, and one line period with the frequency-modulated subcarrier signal which has said second quiescent frequency.

7. An encoding circuit as claimed in claim 1, characterized in that a frequency division circuit is provided between the multiplex circuit and the frequency demodulator for dividing by two the frequency of signals applied by said multiplex circuit to the frequency demodulator.

* * * * *